United States Patent [19]

Galloway

[11] Patent Number: 4,898,044

[45] Date of Patent: Feb. 6, 1990

[54] CAM-DRIVEN LINEAR ACTUATOR APPARATUS

[75] Inventor: Peter E. Galloway, Wilton, Conn.

[73] Assignee: Emerson Electric Co., St. Louis, Mo.

[21] Appl. No.: 262,955

[22] Filed: Oct. 26, 1988

[51] Int. Cl.⁴ .................. F16H 25/12; F16H 25/22
[52] U.S. Cl. ................................ 74/424.6; 74/57; 74/89.14
[58] Field of Search ............ 74/57, 89, 89.14, 424.5, 74/424.6, 99 A

[56] References Cited

U.S. PATENT DOCUMENTS

| | | | |
|---|---|---|---|
| 327,048 | 9/1885 | Wittram | 74/424.6 X |
| 647,491 | 4/1900 | Hoffmann | 74/424.7 |
| 755,416 | 3/1904 | Tuckfield | 74/57 |
| 1,294,125 | 2/1919 | Lepley | 74/424.6 |
| 1,500,099 | 7/1924 | Anderson | 74/424.8 |
| 3,469,460 | 9/1969 | Mersch | 74/89.14 X |
| 3,720,115 | 3/1973 | Vertin | 74/424.6 |
| 3,737,008 | 6/1973 | Wagner | 74/424.6 X |
| 4,285,249 | 8/1981 | Kume | 74/89.15 |
| 4,541,297 | 9/1985 | Fujita | 74/424.6 |
| 4,715,241 | 12/1987 | Lipinski et al. | 74/89.15 |
| 4,715,774 | 12/1987 | Magnuson | 414/751 |
| 4,765,651 | 8/1988 | Unger | 74/424.6 X |

FOREIGN PATENT DOCUMENTS 412397 5/1910 France .

OTHER PUBLICATIONS

Mark One Corporation brochures entitled "Speed Demon" MK 141 High Speed Programmable Electric Transfer Device and MK 109 and MK 121 Power Slides (undated).

Thomson Star Ball Screw assembly brochure, Thomson Industries, pp. 1–13 (undated).

Primary Examiner—Allan D. Herrmann

[57] ABSTRACT

A precision, high load capacity linear actuator apparatus incorporating a rotary-actuated cam is disclosed. A moveable load carriage assembly containing a cam member mounted on bearings therein is free to ride linearly on stationary tracks. The cam member engages stationary cam followers mounted on the stationary tracks' support. In the preferred embodiment, a linear ball-slide mechanism supported in bearings at each end of the stationary track passes through the cam member, with its linear slide member attached to the cam's center bore. Rotary actuation of the linear ball-slide shaft causes rotation of the cam member which is converted into a linear motion of the load carriage along the stationary track. Thus, linear positioning of the load carriage is effected through rotary positioning of the ball-slide shaft through associated motor means. In an alternate embodiment, to be utilized where extremely long linear strokes are required, the drive motor assembly is mounted directly to and travels with the moveable load carriage assembly so as to directly drive the cam member.

5 Claims, 3 Drawing Sheets

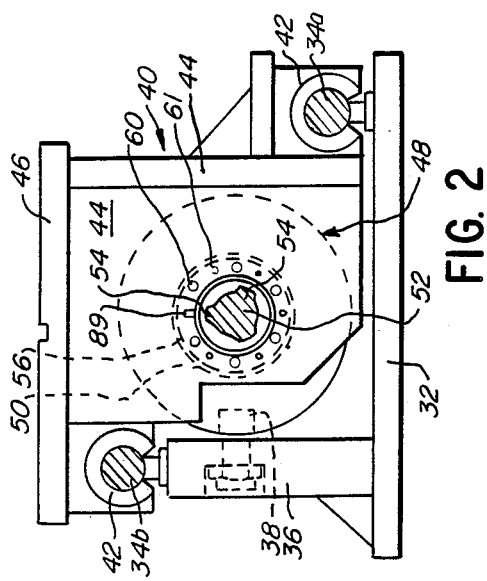
FIG. 2
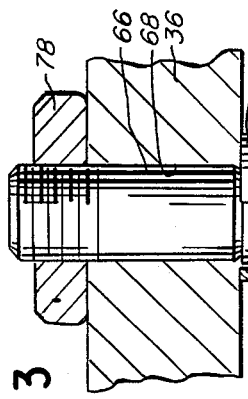
FIG. 3
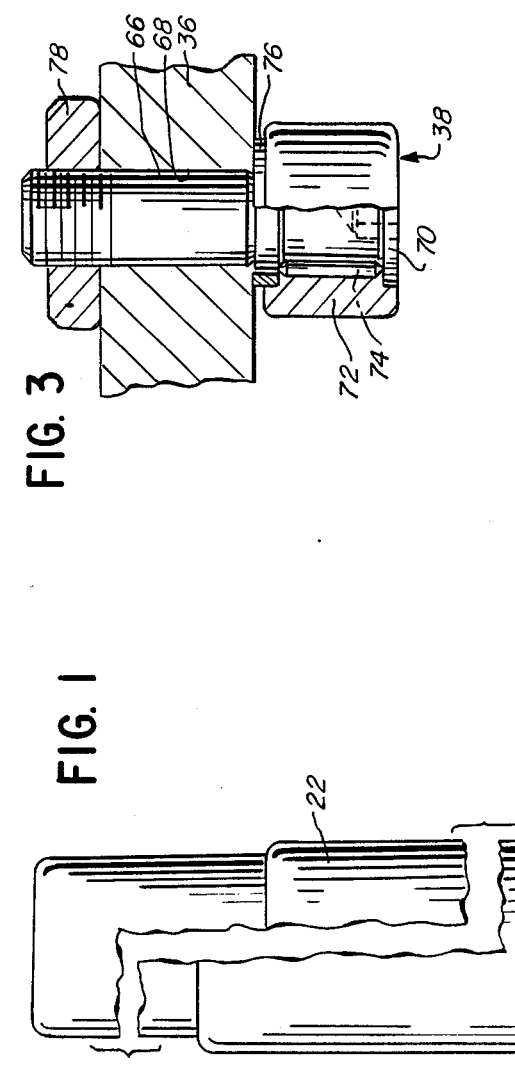
FIG. 1
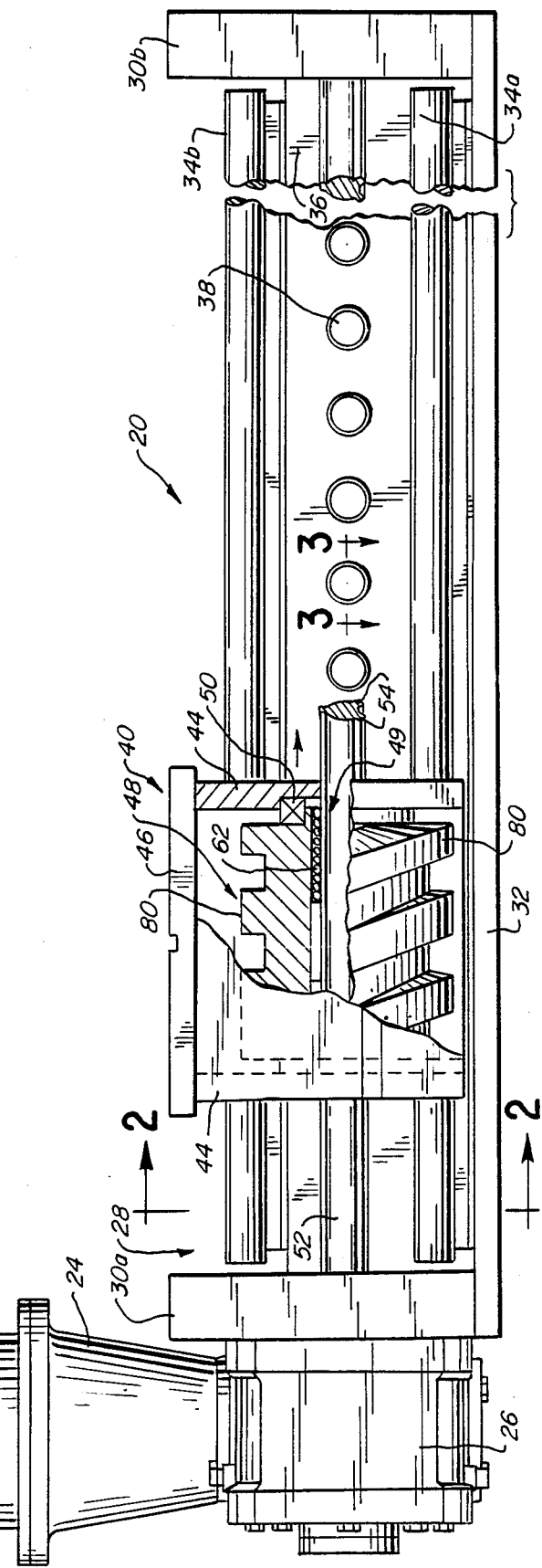

4,898,044

CAM-DRIVEN LINEAR ACTUATOR APPARATUS

FIELD OF THE INVENTION

This invention relates to cam-driven linear actuator mechanisms, and more particularly, to a linear actuator where an aligned series of roller follower members are positionally fixed, while the rotating drive cam is caused to move linearly along an axis parallel to the aligned follower members.

BACKGROUND OF THE INVENTION

The uses for point-to-point linear transfer devices are numerous, i.e., where it is desired to convert rotary motion to linear motion on an economical basis. Typical applications for such linear transfer devices include loaders and unloaders for machine presses, transfer devices for automated machine tools and welding lines, and the like. In such devices the rotating drive cams or screws are held stationary, while the cam followers are mounted on a moveable carriage. Thus, with such prior devices, the cam would have to run the full length of the linear slide mechanism. This would necessitate expensive elongated cam structure; further, such elongated cams inherently had a high moment of inertia requiring large drive motors in order to actuate them.

Several prior mechanisms have been utilized to effect such linear movements. One type prior art linear drive actuator utilized a conventional acme screw mechanism, i.e., a large diameter lead drive screw running the full length of the actuator. Another prior device was the so-called ball screw mechanism, where again the rotating shaft was maintained stationary, and the ball screw slide would move linearly relative to the shaft. However, such ball screw mechanisms have substantial speed limitations, i.e., typically in the range of 500 r.p.m. or less. Also, such ball screw type linear actuators have a relatively low load capacity. Another type prior device was the so-called band-type linear actuator, where a flexible band member, connected at each end to a tooling slide plate, was entrained about two or more drive wheels.

One significant disadvantage with most prior cam-driven linear slide devices was that, because they utilized a relatively few number of cam roller followers, which were in continuous engagement with the drive cam, the life expectancy of such roller followers was very limited. Additionally, with most prior cam-driven linear actuator designs, it was often required to virtually dissemble the moveable load carriage assembly when a cam follower needed to be replaced, as the same were typically carried within the load carriage. Further, most acme or ball screw type prior devices inherently required a high reduction ratio; thus, they had to run at very high speeds or for excessive rotations just to produce the desired linear actuation motion.

SUMMARY OF THE INVENTION

The present invention overcomes the disadvantages of the prior art as it comprises a cam-driven linear actuator apparatus in which a load carriage assembly is supported by bearings upon fixed linear guide tracks. The load carriage assembly is also mounted for linear movement, but not angular rotation, upon a linearly-extending ball slide mechanism which, in turn, is driven by an associated drive motor. A stationary series of cam roller followers are aligned along the load carriage assembly's path for engagement with the drive cam rotatably carried thereby. The drive cam is affixed to the ball slide member so as to rotate and move linearly therewith. In operation, rotation of the ball spline shaft by the motor causes the ball slide member and attached cam to turn, whereby, since the aligned cam followers are locationally fixed, the cam, and hence the load carriage assembly, is linearly driven along the ball slide shaft.

Thus, in the present invention, the cam roller followers are stationarily mounted while the drive cam moves linearly relative thereto. This unique arrangement allows the drive cam to be of a relatively short overall length, inasmuch as it only needs to contact a few cam roller followers at any given instant, yet still retaining a preload therewith to prevent backlash. As a result, the life expectancy of the cam roller followers of the present invention is significantly increased, and the manufacturing costs of the drive cam are greatly reduced, as compared to prior art devices.

Further, due to the relatively short cam length, it has a low moment of inertia; this in turn permits use of relatively small drive motors. Additionally, where a particular application requires a long linear stroke, such as 15 feet or more, for example, it is now permissible to use a short, inexpensive cam mechanism built in accordance with the present invention. That is, one relatively short cam can be used regardless of the required length of the aligned series of stationary cam roller followers. Also, because of the relatively low reduction ratio inherent in the present invention, a small rotational movement of the ball spline shaft achieves a substantial linear travel for the load carriage assembly. Further, when it is time to replace a particular cam roller follower, the present load carriage assembly can readily be moved out of the way, such that the worn follower is easily accessible and can be quickly removed and replaced.

Therefore, it is a principal object of the present invention to provide a cam-driven linear actuator in which a series of cam followers are held stationary and mounted along a linear path, while the drive cam is allowed to rotate about an axis parallel to the cam followers' linear path and caused to linearly travel therealong.

It is a further object of the present invention to provide a cam-driven linear actuator device in which the drive cam is of relatively short length, regardless of the length of slide motion required in a particular application, thereby creating a relatively low moment of inertia such that a relatively small drive motor can be utilized.

It is yet a further object of the present invention to provide a cam-driven linear actuator in which the rotating cam is affixed to the slide member of a ball slide mechanism, whereby the cam can both rotate with and linearly travel along the ball slide shaft.

The means by which the foregoing and other objects of the present invention are accomplished and the manner of their accomplishment will be readily understood from the following specification upon reference to the company drawings, in which:

FIG. 1 is a front elevation view of the cam-driven linear actuator apparatus of the present invention, and showing certain components broken away for better viewing;

FIG. 2 is an end elevation view, taken along lines 2—2 of FIG. 1, of the linear actuator thereof;

FIG. 3 is a section view, taken along lines 3—3 of FIG. 1, showing a cam roller follower as used in the present invention;

DESCRIPTION OF THE PREFERRED EMBODIMENT

Figure 4:
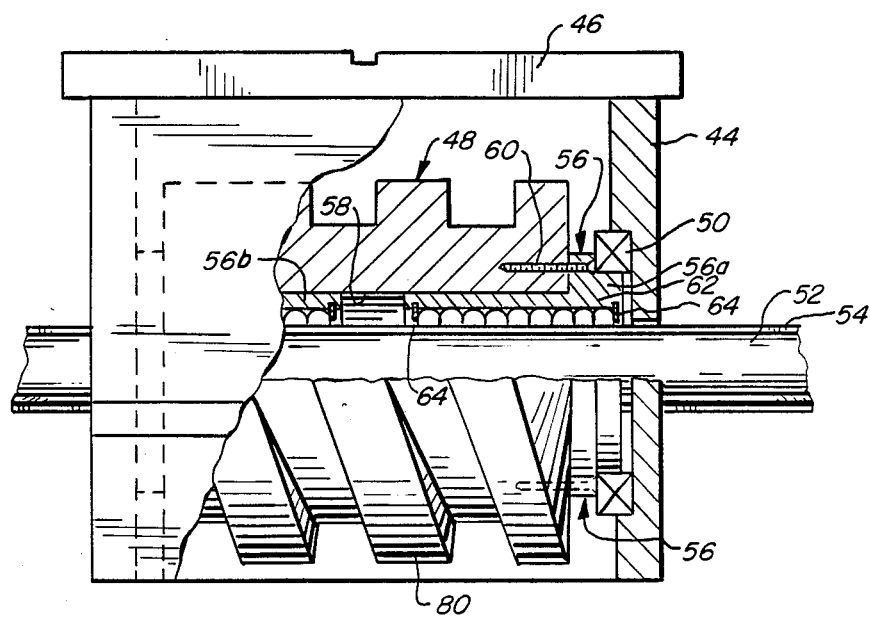
FIG. 4 is an enlarged front elevation view, partially in section, of the load carriage assembly of the present invention and showing a flanged mounting arrangement for the drive cam.

Having reference to the drawings, wherein like reference numerals indicate corresponding elements, there is shown in FIG. 1 an illustration of the preferred embodiment of the cam-driven linear actuator apparatus of the present invention, generally denoted by reference numeral 20. The linear actuator 20 comprises a motor 22 connected by an adaptor 24 to a reducer 26 which is mounted at one end of a linear track assembly, generally denoted by reference numeral 28. The reducer is preferably of the minimum backlash type.

The track assembly 28 includes end plates 30A, 30B and a base plate 32. The base plate 32 carries adjacent its one edge (see FIG. 2) a linear guide track 34A, and adjacent its other edge, as mounted upon a track support 36 in an elevated manner, a linear guide track 34B. Stationary cam roller followers, generally denoted by reference numeral 38, are each affixed to and supported by the track support 36 in an aligned series (see FIGS. 1 and 2).

A load carriage assembly, generally denoted by reference numeral 40, is slidably mounted by bearings 42 upon the guide tracks 34A, 34B for linear movement therealong; however, the load carriage 40 cannot angularly rotate. The housing for the load carriage assembly 40 comprises a lower housing wall 44 and an upper tooling mounting plate 46. Preferably, the bearings 42 are so-called Thompson linear roller bearings, but any suitable type bearing can be used.

A barrel-type drive cam, generally denoted by reference numeral 48, is mounted (either directly or indirectly, as discussed below in relation to FIGS. 4 and 5) by bearings 50 to the carriage housing walls 44, such that it is rotatable within the load carriage 40. In the preferred embodiment, the drive cam 48 comprises a constant lead-type barrel cam. However, depending upon the type of slide movement desired in any given linear actuator application, and depending further upon the type of drive motor 22 that is used and how it is controlled, different type cams can be used. For example, an index cam, variable velocity cam, or an oscillating cam could be used for drive cam 48.

Also, it will be understood that the drive cam 48 is formed as a relatively short cam member. That is, in the preferred embodiment, the drive cam could be from four to ten inches in length, for example, yet provide a linear stroke of several feet or more. This is contrasted to the prior art devices where the drive cam necessarily extended the entire length of the desired linear stroke. Thus, it was not uncommon for such prior devices' cams to be several feet or more in length.

It will be understood that the bearings 50 can be roller bearings, ball bearings, tapered roller bearings, or any other type bearing which gives proper rotational support on the carriage wall 44 to the drive cam 48.

The drive cam 48 is rotatably driven by a ball slide mechanism, generally denoted by reference numeral 49, which mechanism also permits the cam 48 to move linearly along the cam's axis of rotation (which as seen in FIG. 1 is parallel to the aligned series of cam followers 38). In the preferred embodiment there is mounted at each end of linear actuator 20, within suitable roller bearings (not shown) which are carried by the respective end plates 30A, 30B, a rotatable ball spline shaft 52. The left end of ball spline shaft 52, as shown in FIG. 1, is connected to and rotatably driven by the output (not shown) of the reducer 26. Preferably, the ball spline shaft 52 is of the type having axially-protruding and longitudinally-extending drive ribs 54 (see FIGS. 1 and 2). The other half of the ball slide mechanism comprises a flanged spline nut 56. As best seen in FIG. 4, the spline nut 56 comprises two separate halves 56A, 56B. In the preferred embodiment of FIGS. 1-4, the ball slide mechanism 49 is a commercially available ball spline shaft mechanism sold under the THK brand.

In any event, as best seen in FIGS. 1, 2, and 4, the ball spline shaft 52, along with the flanged spline nuts 56A, 56B, extend through the central bore 58 of drive cam 48. In the particular mounting arrangement of FIG. 4, the flanged spline nuts 56A, 56B are journalled directly by the bearings 50 and are fastened via threaded fasteners 60 and dowel pin 61 to the drive cam 48, such that rotation of the flanged spline nut 56 effects rotation of the drive cam 48 and vice versa.

In a well-known manner, the recirculating drive balls 62 of the ball slide mechanism 49 are retained by a retainer ring 64 on the interior of the spline nut 56. So as to prevent unwanted backlash for actuator 20, the drive balls 62 are pre-loaded during assembly against the respective drive ribs 54 of ball spline shaft 52. Also it will be understood that other configurations for the ball slide mechanism 49 will work in the present invention, as long as both rotary motion and linear sliding movement is provided by the particular mechanism's slide member to the drive cam 48.

As best seen in FIG. 3, each of the cam roller followers 38 comprises a threaded stud portion 66 which extends through an appropriate opening 68 of the track support 36. The threaded stud 66 terminates at one end in an enlarged head portion 70 against which is seated the cam roller 72 and the needle bearings 74; these are retained by a retainer ring 76. The other end of the stud 66 is retained against the track support 36 by a fastener 78. The cam followers 38, thus, provide high load-carrying capacity for the linear slide actuator 20. Also, so as to prevent unwanted backlash during operation, the drive cam is pre-loaded as is well-known against the cam followers 38 during assembly of the linear actuator 20.

Each of the aligned and equally-spaced cam roller followers 38 is able to engage the respective cam elements 80 of the rotating drive cam 48. However, the followers 38 are each positionally affixed to track support 36 and thus, do not move relative to the slidable load carriage assembly 40. That is, the cam 48 moves along the line of roller followers 38, not vice versa.

Figure 5:
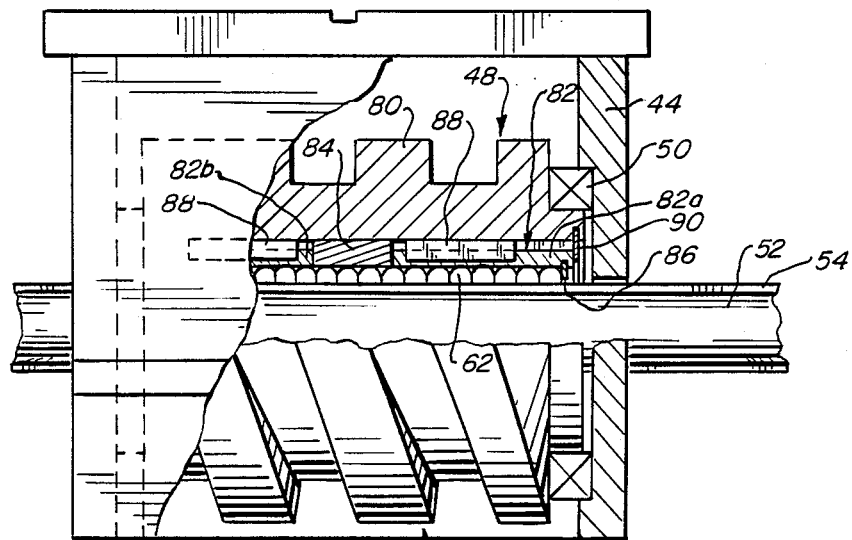
FIG. 5 is another enlarged front elevation view like FIG. 4 but showing an alternate mounting arrangement for the drive cam.

FIG. 5 depicts an alternate arrangement for attaching the slide member of the ball slide mechanism 49 to the drive cam 48. That is, rather than using a flanged spline nut 56 (see FIG. 4), FIG. 5 depicts a modified spline nut 82 comprising respective spline nut halves 82A, 82B, which are separated by a spacer 84. In this alternate mounting arrangement, the spline nut halves 82A, 82B are respectively secured to the drive cam 48 by retainer keys 88 fitted in mating keyways (see keyway 89 in FIG. 2). The recirculating drive balls 62 are retained to the spline nut halves 82A, 82B by retainer rings 86. Further, the spline nut halves 82A, 82B are retained axially relative to the drive cam 48 by an end retainer plate 90 (only one shown).

However, in this alternate mounting arrangement of FIG. 5, the keyed combination of drive cam 48 and modified spline nut 82 is again rotatably journalled on the lower housing wall 44 by roller bearing 50. Yet, in this alternate mounting arrangement, the drive cam 48 is directly journalled on the housing wall 44 by bearings 50, rather than being indirectly journalled (via flanged spline nut 56) in the preferred mounting arrangement of FIG. 4. Nevertheless, it will be understood that, other than the specific difference regarding the particular arrangement for journalling the joined combination of the drive cam 48 and the respective spline nuts 56, 82, the two embodiments depicted in FIGS. 4 and 5 operate and function in the same manner, as will now be discussed.

The motor 22 and reducer 26 operate to drivably rotate the ball spline shaft 52 in either direction, and for a specific number or degrees of rotation(s). The motor 22 can be a so-called stepping motor, whereupon by selectively turning on and off the motor 22 for desired periods via control means (not shown), a known rotation for ball spline shaft 52 can be achieved. Preferably, such a stepping motor would be combined with a drive cam 48 of the so-called lead-cam or constant velocity design. Another motor usable with such cams is a so-called servo motor.

Alternatively, the drive cam 48 could be an indexing-type cam, of a barrel cam design. In that case, the motor 22 preferably would be a constant rotation type motor. This specific combination would result in a step-wise movement, i.e., a fixed incremental indexing movement, for the ball spline shaft 52. Yet another type motor 22 that could be used with the present invention is an alternating current type motor, with an accompanying clutch brake.

In any event, regardless what specific motor is used to drive the spline shaft 52, any rotation thereof will likewise cause the associated spline nut 56 to rotate, due to the angularly-constrained recirculating drive balls 62. Moreover, since the drive cam 48 is affixed by fasteners 60 (or alternatively by keys 88) to the spline nut 56 (or alternatively the nut 82), the drive cam 48 also is caused to rotate.

Due to the presence of the aligned series of stationary cam roller followers 38, at least a few of which are always in engagement with the cam lobes 80 of drive cam 48, any rotation of the cam 48 causes it to be linearly moved. That is, rotation of cam 48 causes the engaged roller followers 38 to create a linear thrust motion on the cam lobes 80, whereby the drive cam 48 (and the affixed spline nut 56 or 82) is caused to be linearly driven along the ball spline shaft 52. This linear action will occur because the recirculating drive balls 62 not only transfer the rotary drive motion of the shaft 52 and its drive ribs 54 to the spline nut 56, but also permit linear movement of the spline nut 56 (and the affixed drive cam 48) relative to the ball spline shaft 52.

Further, since the carriage housing walls 44, 46 are rotatably journalled to and carried by the joined combination of drive cam 48 and spline nut 56, via journal bearings 50, any linear movement induced into drive cam 48 (by its rotation against the followers 38) necessarily causes the load carriage assembly 40 to also move linearly, as journalled along the guide tracks 34A, 34B. In sum, controlled rotary positioning of the ball spline shaft 52 effects the desired linear positioning of the load carriage assembly 40. Depending upon the type of motor 22 and how it is controlled, and also depending upon the type of cam selected for drive cam 48, any number of different linear actuation motions can be achieved for the load carriage assembly 40 and any tooling or workpiece gripper devices associated therewith.

Figure 6:
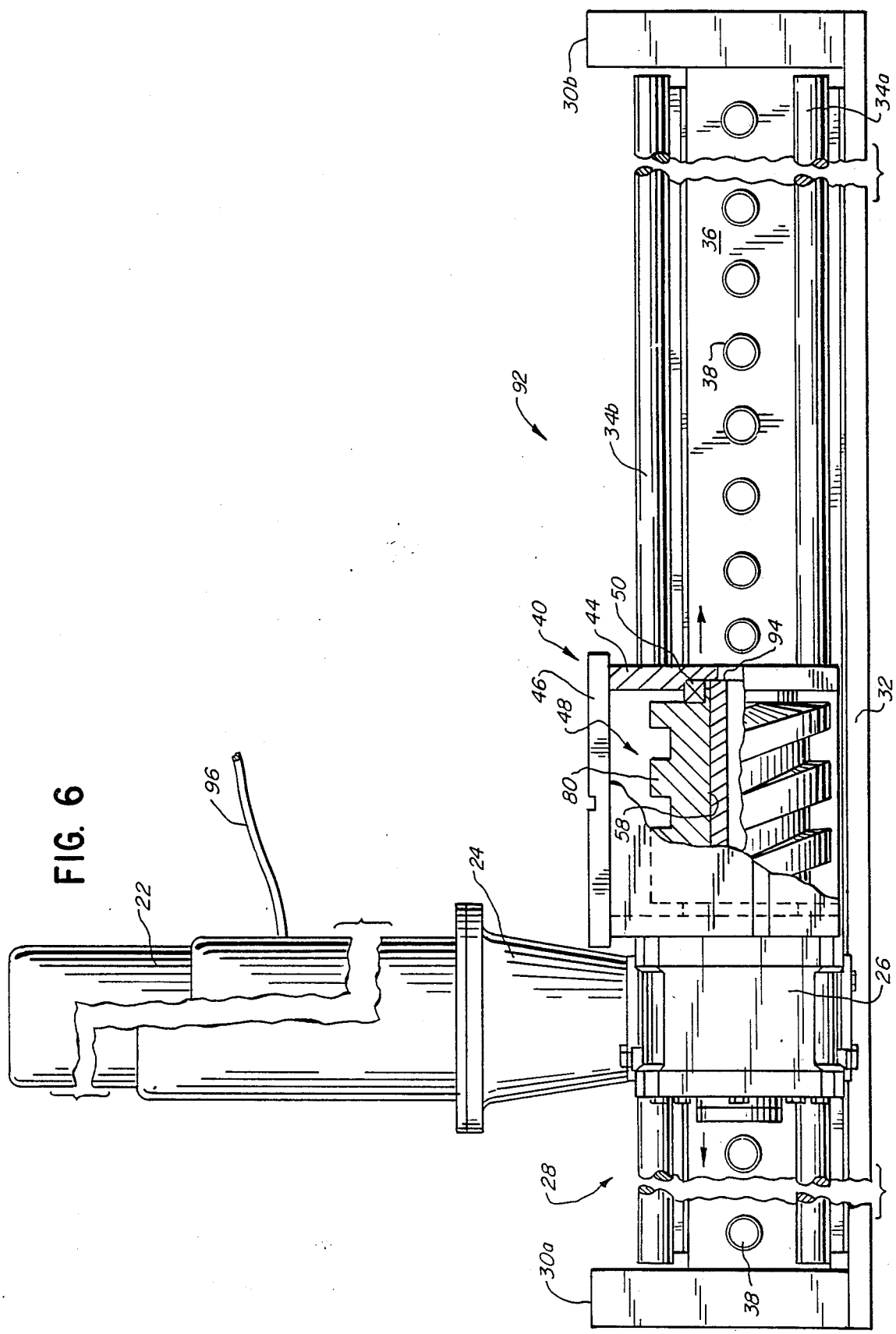
FIG. 6 is a front elevation view of an alternate embodiment of the linear actuator of the present invention, and showing a direct drive arrangement for the drive cam.

There is shown in FIG. 6 an alternate embodiment of the present invention, namely, a linear actuator apparatus generally denoted by reference numeral 92. It is useful in those applications where a relatively long slide motion is required, i.e., fifteen feet or more, for example. This alternate linear drive actuator 92 comprises the same basic components as utilized for the preferred embodiment of the present invention (see actuator 20, as described above in connection with FIGS. 1-5), but with certain exceptions. Importantly, the ball slide mechanism 49 is eliminated, and instead, the motor drive assembly (comprising motor 22, adaptor 24, and reducer 26) are mounted directly to the load carriage assembly 40. The reducer's output shaft 94 thus extends through the central bore 58 of drive cam 48 and is rigidly mounted to the cam by appropriate keys (not shown).

With this direct mounting arrangement, the motor drive assembly for this alternate linear actuator device 92 physically travels with the load carriage assembly 40; it receives power from a travelling flexible power cord 96. In this manner, the motor drive assembly and the load carriage assembly 40 are free to travel linearly along the guide tracks 34 and aligned series of cam roller followers 38 no matter what their required length might be. Thus, this alternate actuator 92 is not dependent upon the maximum length of any commercially available ball slide mechanism, such as the mechanism 49 of the preferred embodiment.

Notwithstanding such differences, both the alternate form of actuator 92 and the preferred form of actuator 20 operate in the same manner. That is, with both, the rotation of the drive cam 48 causes the series of fixed followers 38 to produce a linear thrust on the drive cam 48, and hence, the load carriage assembly 40.

Due to the fact that the present invention permits the use of a relatively short drive cam member 48, several significant advantages are achieved. First, the manufacturing costs of the drive cam 48 itself are reduced in view of its shortened length. Second, the cam's short length permits it to be easily moved out of the way when a particular cam roller follower element 38 becomes worn and needs replacement, i.e., easy accessibility. Third, the cam's short length inherently results in relatively low moments of inertia as seen by the reducer 26 and drive motor 22, thereby permitting use of small capacity motor drive assembly components, yet without compromising the ultimate output load capability of the linear actuator. Fourth, the drive cam 48 need not be custom built for each different required slide movement. Instead, one drive cam 48 (and the associated load carriage assembly 40) can work for many different lengths of required linear stroke, and only the length of the aligned series of cam followers need be changed in any given application. And fifth, since the cam 48 is relatively short and only a given number of followers 38 are engaged with the cam at any one time, the longevity of the followers 38 is greatly enhanced.

From the foregoing, it is believed that those skilled in the art will readily appreciate the unique features and advantages of the present invention over previous types of linear slide actuators and linear transfer devices. Further, it is to be understood that while the present invention has been described in relation to particular preferred and alternate embodiments as set forth in the accompanying drawings and as above described, the same nevertheless are susceptible to change, variation and substitution of equivalents without departure from the spirit and scope of this invention. It is therefore intended that the present invention be unrestricted by the foregoing description and drawings, except as may appear in the following appended claims.

I claim:

1. A linear actuator apparatus comprising:
   a drive motor assembly;
   slide mechanism means driven by said drive motor assembly and operable to convert rotary motion into linear motion, said slide mechanism means comprising an elongated shaft means and a slide means, said slide means rotatably driven by said shaft means and linearly slidable therealong;
   a drive cam member securably mounted to said slide means and operable to both rotate and linearly slide therewith;
   a plurality of aligned cam follower members each positionally fixed and respectively engageable with said drive cam member; and
   load carriage means journalled for sliding movement along a path parallel to said plurality of aligned cam follower members, said load carriage means also journalably supported relative to said drive cam member and said slide means, whereby rotation of said drive motor causes rotation of said drive cam member whereupon said engagement of said positionally fixed cam follower members with said drive cam member causes said drive cam member and said load carriage means to move linearly.

2. The invention of claim 1, wherein said slide mechanism means comprises ball slide means in which said elongated shaft means comprises an elongated drive shaft having axially-protruding drive ribs and said slide means comprises a ball slide spline nut carrying a recirculating series of drive balls engageable with said drive ribs.

3. The invention of claim 2, wherein said drive ribs extend longitudinally of said elongated drive shaft.

4. The invention of claim 1, wherein said load carriage means is journalled directly on said drive cam member.

5. A linear actuator apparatus comprising:
   load carriage means linearly slidably supported by elongated track means;
   drive cam means rotatably supported relative to said load carriage means;
   a plurality of cam follower means positionally fixed in a series aligned parallel with said elongated track means and each respectively engageable with said drive cam means, said cam follower means being pre-loaded with said drive cam means so as to prevent backlash therebetween; and
   drive motor assembly means mounted to said load carriage means and directly rotatably driving said drive cam means,
whereby rotation of said drive cam means against said positionally fixed cam follower means effects controlled linear sliding movement of said drive cam means and said load carriage means along said elongated track means.

* * * * *